United States Patent Office
3,389,554
Patented June 25, 1968

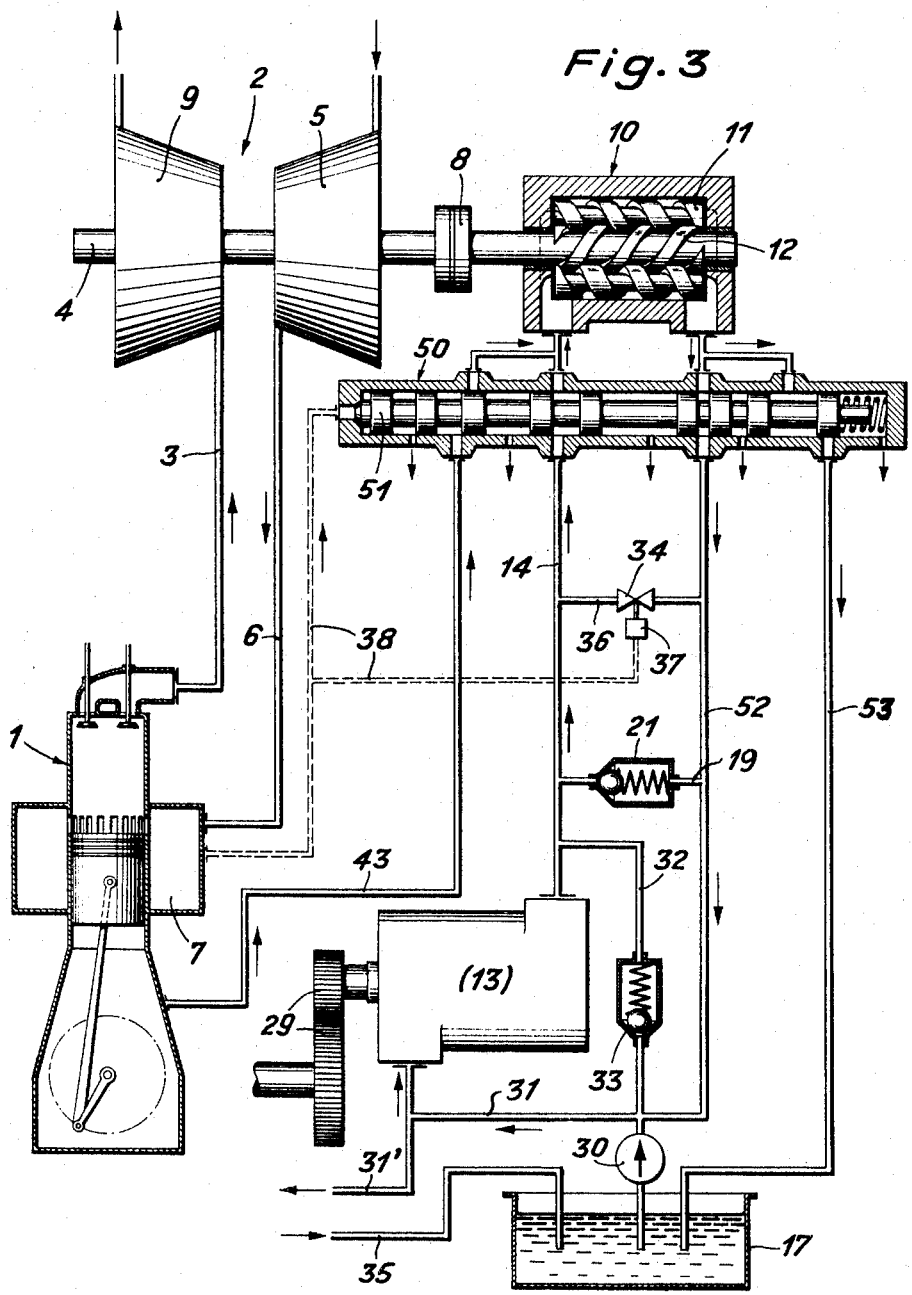

3,389,554
SUPERCHARGED INTERNAL COMBUSTION PISTON ENGINE
Gottlieb Wolf, Winterthur, Switzerland, assignor to Sulzer Brothers Limited, Winterthur, Switzerland, a Swiss company
Filed Aug. 30, 1967, Ser. No. 664,401
Claims priority, application Switzerland, Sept. 9, 1966, 13,106/66
12 Claims. (Cl. 60—13)

ABSTRACT OF THE DISCLOSURE

A supercharged internal combustion piston engine having at least one exhaust-driven turbo compressor for supplying combustion air to the engine is disclosed. The turbo compressor is provided with an auxiliary drive for supplying additional power thereto, the auxiliary drive comprising a hydraulic volumetric motor unit coupled directly to the turbo compressor, and a power driven pump unit connected by appropriate hydraulic conduits to the hydraulic motor unit and to a reservoir for hydraulic fluid. The hydraulic conduit leading to the hydraulic motor unit is connected to a source of air by means of an air conduit. The air conduit is provided with a normally closed pressure actuated valve which is adapted to open when the pressure on the pressure-responsive actuating mechanism of the valve reaches a predetermined value. When the pressure actuated valve is thus opened, air or a mixture of air and hydraulic fluid flows through the motor unit.

Background of the invention

Supercharged internal combustion piston engines are commonly equipped with exhaust-driven turbo compressors or blowers which deliver combustion air to the piston engine. Under certain operating conditions, for example, at low speeds or under shock loads, the turbo compressor fails to deliver sufficient combustion air to the piston engine for efficient operation of the engine, and an auxiliary drive is sometimes provided which supplies additional power to the turbo compressor under these conditions. It has been proposed that the auxiliary drive for the turbo compressor be a hydraulic volumetric motor unit that is directly connected by a permanent coupling to the drive shaft of the turbo compressor. The hydraulic motor unit is driven by hydraulic fluid supplied by a power driven hydraulic pump unit. This arrangement provides an auxiliary drive for the turbo compressor which is simple in construction and does not require expensive and complicated transmission gearing. However, because the hydraulic motor unit is directly connected to the turbo compressor, under certain operating conditions (for example, under full load or high speed conditions), the motor unit is driven by the turbine of the supercharger instead of by the hydraulic fluid supplied by the pump unit. When this happens, the motor unit acts as a pump for the hydraulic fluid passing therethrough. The pumping action of the motor unit under these circumstances consumes power and reduces by that amount the power available for operation of the turbo compressor. In addition, the sharply reduced pressure of the hydraulic fluid being sucked through the motor unit can cause cavitation and consequent damage to the apparatus.

Summary of the invention

The object of the present invention is to overcome the aforementioned disadvantages of direct coupled auxiliary drive hydraulic motor units and to provide an arrangement by which, under all operating conditions of the piston engine, cavitation in the hydraulic motor unit is prevented. To this end, my improvement in supercharged internal combustion piston engines of the type described comprises connecting the hydraulic conduit leading to the hydraulic motor unit to a source of air by way of an air conduit. The air conduit is provided with a normally closed pressure actuated valve, this pressure actuated valve being adapted to open to permit air to flow through said air conduit when the pressure on the pressure-responsive actuating mechanism of the valve reaches a predetermined value. In certain preferred embodiments of my invention the hydraulic conduits leading to and from the hydraulic motor unit are connected by a by-pass conduit provided with a pressure relief valve which permits excess hydraulic fluid from the pump unit to by-pass the motor unit. In addition, a normally open pressure actuated valve is advantageously disposed in the hydraulic conduit leading to the hydraulic motor unit between the aforementioned by-pass conduit and the air conduit, the pressure actuated valve being adapted to shut off the flow of hydraulic fluid to the motor unit when the pressure on the pressure-responsive actuating mechanism of the valve reaches a predetermined value. Moreover, the pressure actuated valves in the air conduit and in the hydraulic conduit are advantageously coupled together so that when the actuating pressure reaches said predetermined value air commences to flow through the motor unit at the same time that hydraulic fluid ceases to flow therethrough. The pressure actuated valves may be adapted to operate whenever the pressure of the air delivered to the engine by the turbo compressor exceeds a given value, or whenever the pressure of hydraulic fluid in the conduit leading to the motor unit falls below a given value, or whenever the pressure differential between the air delivered by the compressor and the fluid in the hydraulic conduit reaches a given value, or whenever any other variable pressure that is indicative of engine performance reaches a given predetermined value.

Brief description of the drawings

My invention will be more fully described in conjunction with the accompanying drawings of which:

FIG. 3 is a view similar to FIG. 1 showing a further modification of the arrangement shown in FIG. 2.

Detailed description

Figure 1:
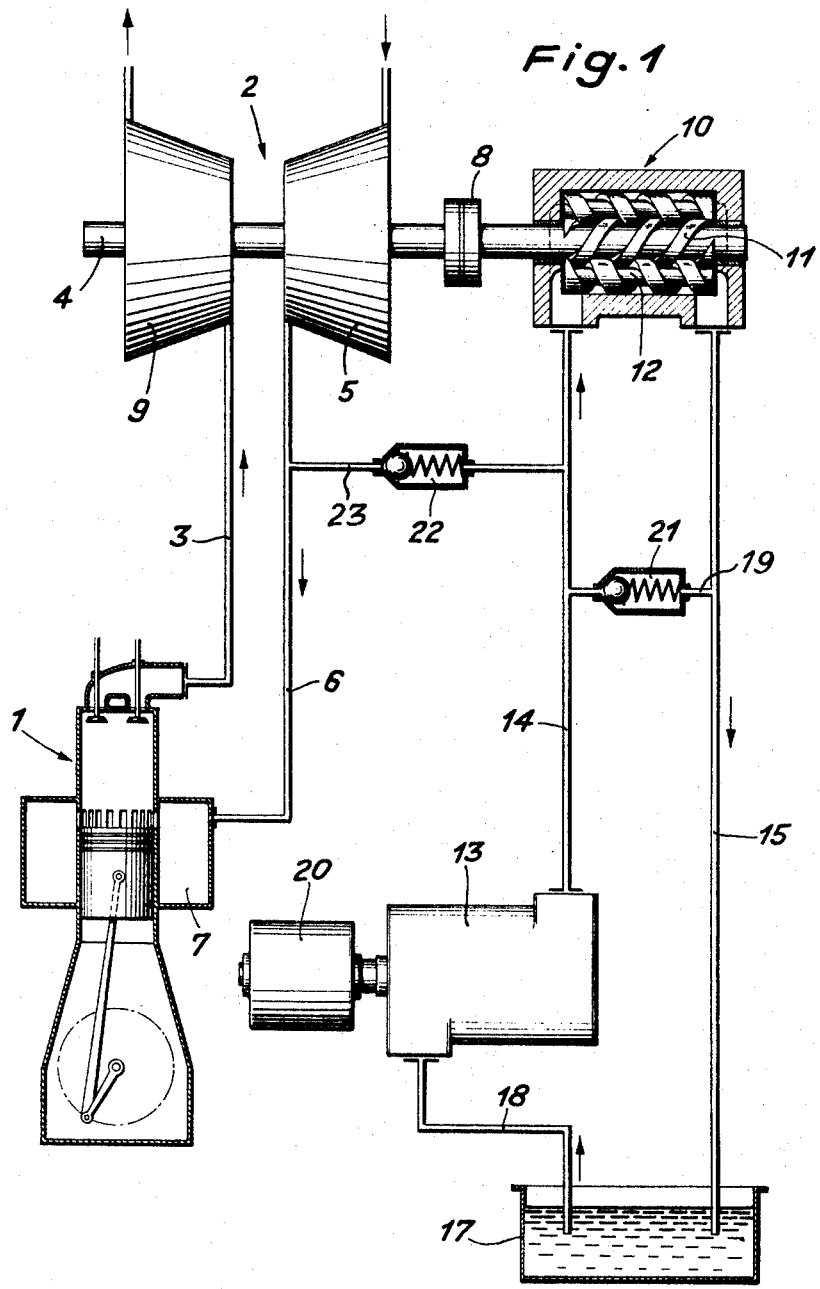
FIG. 1 is a diagrammatic view, partly in section, of a supercharged internal combustion engine equipped with an auxiliary drive for the turbo compressor that embodies the improvement of my invention.

In the embodiment of my invention shown in FIG. 1, a longitudinally scavenged supercharged two-stroke diesel engine 1 is equipped with a turbo supercharger unit 2. The supercharger unit 2 comprises a rotatable shaft 4 on which are securely mounted a turbo blower or compressor 5 and a turbine 9. The turbine 9 is driven by exhaust gases from the engine 1 delivered to the turbine through the exhaust line 3, and compressed combustion air from the turbo compressor 5 is delivered through the air line 6 to the air reservoir 7 of the engine 1. Under certain conditions of operation, for example, at low engine speeds or when the engine is subjected to shock loads, the turbo compressor 5 sometimes fails to deliver sufficient combustion air to the reservoir 7 for efficient operation of the engine 1. Accordingly, the supercharger unit 2 is advantageously provided with an auxiliary drive that delivers additional power to the turbo compressor 5 when operating under the aforementioned conditions.

As previously noted, it has been proposed that the auxiliary drive comprise a hydraulic volumetric motor unit 10 that is coupled to the shaft 4 of the turbo supercharger unit 2 by means of a solid coupling 8, that is to say, a coupling which cannot be released during operation, but which may, for example, be resilient. Advantageously, the motor unit 10 is a hydraulic screw machine with parallel rotors 11 and 12 which operate on the conventional screw pump principle. Hydraulic fluid under pressure is delivered to the motor unit 10 by the hydraulic pump unit 13 through the hydraulic pressure line or conduit 14, and the fluid is returned through hydraulic discharge line or conduit 15 to the hydraulic fluid reservoir 17. The reservoir 17 is advantageously the lubricating-oil tank for the piston engine 1. Hydraulic fluid (for example, lubricating oil) is drawn from the reservoir 17 by the hydraulic pump unit 13. In the embodiment of my apparatus shown in FIG. 1 the pump unit 13 is operated by a separate drive motor 20, for example an electric motor, which runs at a constant speed regardless of the speed of the diesel engine 1. Alternatively, however, the pump 13 may be operated from the crank shaft of the diesel engine. The hydraulic conduits 14 and 15 are connected by a by-pass conduit 19 provided with a relief valve 21 which prevents an excessive pressure rise in line 14. Also, in accordance with the invention, the hydraulic conduit 14 leading to the motor unit 10 is connected to a source of air by an air line 23 provided with a normally closed pressure actuated relief valve 22. In the embodiment of the invention shown in FIG. 1 the air line 23 is connected to the air line 6 of the engine. During operation of the piston engine 1, hydraulic fluid from tank 17 is delivered by the pump unit 13 into pressure 14 from whence it flows into the volumetric motor unit 10 and is discharged along the discharge conduit 15. The power supplied to the hydraulic motor 10 is transmitted by way of the coupling 8 and the shaft 4 to the turbo compressor 5 of the supercharger unit 2.

At lower piston engine outputs, for example under a partial load, the turbine 9 and compressor 5 will often derive less energy from the exhaust gases than they require for satisfactory operation of and an adequate air supply for the engine. If the pump unit 13 and motor unit 10 are of suitable size, the shaft 4 of the turbo supercharger unit can receive additional power from the motor 10 in such situations. During full load operation, however, the exhaust-driven turbine 9 receives enough power from the exhaust gases and no further power need be supplied by the motor 10. Moreover, during full load operation the turbo supercharger unit 2 runs at a higher speed than previously, and as a consequence of the direct coupling 8 causes the moving parts of the motor unit 10 to rotate at this higher speed. Suitable design of the pump unit 13 can insure that when the turbo supercharger unit 2 and the motor unit 10 are running at this high speed the quantity of oil supplied by the pump 13 is insufficient to drive the motor 10, and in this case the motor 10 is driven by the turbine 9 and operates as a pump.

When the motor unit 10 operates as a pump the pressure drops in the hydraulic conduit 14 leading to the motor 10. When the pressure in the hydraulic conduit 14 drops the pressure of compressed air in the air line 6 causes the pressure actuated relief valve 22 to open and thereby allow air at a pressure above atmospheric pressure to flow through the line 23 into the conduit 14. However, since the hydraulic pump 13 is still working, the hydraulic motor 10 now receives a mixture of air and oil. In this way cavitation of fluid in the motor 10 is prevented, and at the same time the motor is cooled and lubricated. Moreover, although the motor 10 is coupled to the shaft 4, its energy consumption under these circumstances is minimal. As soon as the supercharger unit 2 slows down because of a reduction in the output of the piston engine, the supercharge pressure in air line 6 drops and the fluid pressure in hydraulic conduit 14 rises. The valve 22 then closes and the motor 10 resumes its driving function.

Figure 2:
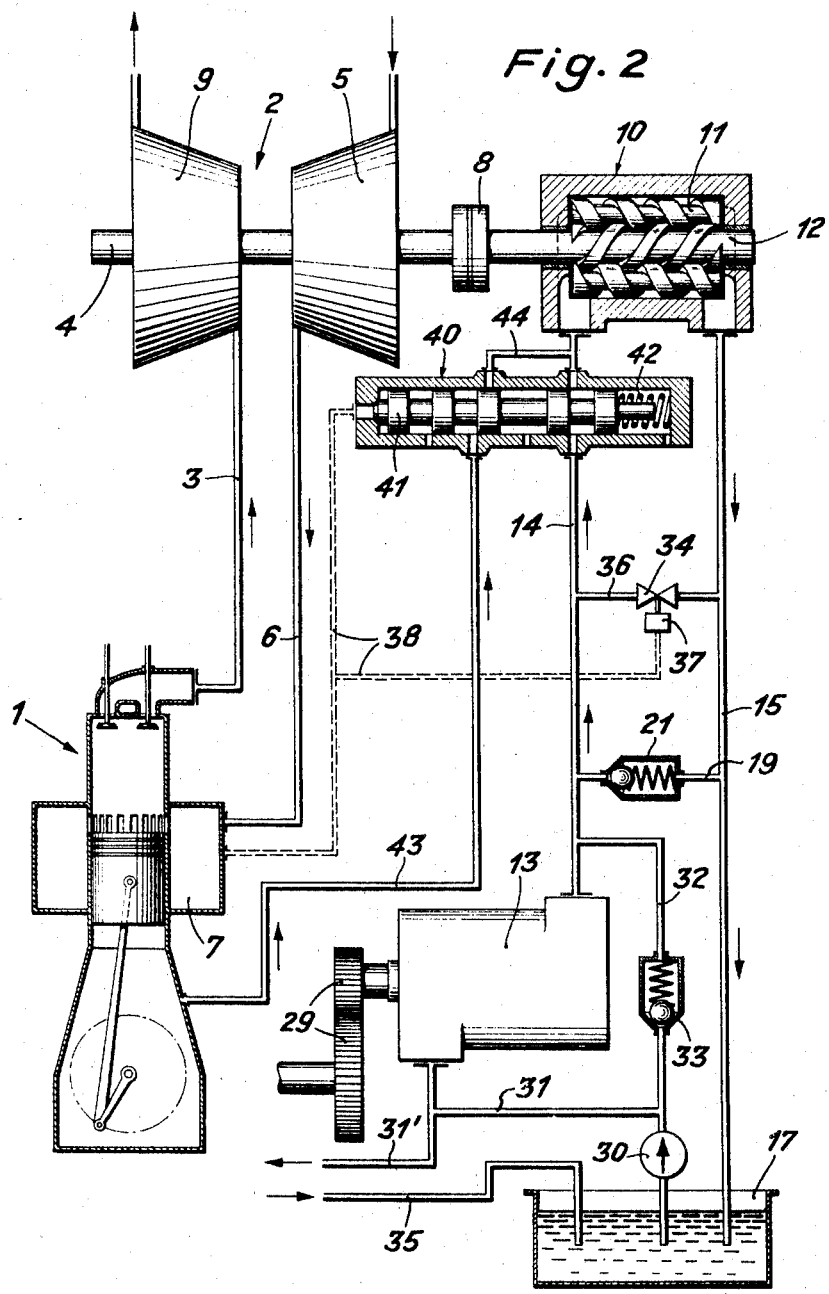
FIG. 2 is a view similar to FIG. 1 showing an advantageous modification of the arrangement shown in FIG. 1.

In the alternative embodiment of my invention shown in FIG. 2, in those working ranges of the piston engine 2 where driving by the hydraulic motor 10 is not required, the supply of hydraulic fluid to the motor 10 is cut off and the motor is connected only to a source of air.

In the apparatus of FIG. 2 the hydraulic pump 13 is driven by the piston engine crankshaft by means of a transmission 29. The pump 13 is connected to the reservoir 17 by a hydraulic conduit 31 that is provided with a fluid transfer pump 30. The transfer pump 30 may be the ordinary lubricating-oil pump for the internal combustion engine, supplying lubricating oil from the tank 17 to the lubrication points in the engine by way of a pressure line 31'. From the lubrication points the oil flows back into the tank 17 along a line 35. The pump 13 has a by-pass conduit 32 connected to hydraulic conduits 31 and 14 provided with a normally closed relief valve 33. The hydraulic conduits 14 and 15 are connected by a by-pass conduit 36 that is provided with a control valve 34. The valve 34 is operated by a servomotor device 37 in response to a signal from a signal line 38 that, in turn, is dependent on an operating value for the internal combustion engine or turbo supercharger unit. For example, in the embodiment shown in the drawing the signal line 38 actually carries compressed air from the air reservoir 7, the control device 37 of the valve 34 responding to an increase in the pressure of compressed air in the reservoir 7 to open the valve 34 when said pressure reaches a predetermined value. The opening of valve 34 is made by servo-motor device 37 to vary directly with pressure in line 38.

The embodiment of my new apparatus shown in FIG. 2 also has a spool valve 40 which is also connected to the signal line 38. Compressed air from the air reservoir 7 acts on the end face of the valve member 41 and moves it against the action of a spring 42 when the pressure of air in the reservoir 7 reaches a predetermined value. The valve 40 is normally in the position shown in the drawing in which position the air lines 43 and 44 are closed off from each other while the hydraulic conduit 14 is open through the spool valve and into motor 10. When the pressure of air in the line 38 reaches said predetermined value, the spool of the valve 40 shifts to the right, in which position the air line 43 connects to air line 44 while the hydraulic conduit 14 is closed. In the latter condition the motor 10 driven by the turbine 9 pumps only air from air line 43. Advantageously, air line 43 is connected to the crank case of the piston engine so that motor 10, when acting as a pump, aspirates air from that crank case.

When operating conditions of the piston engine are such that additional power is required to drive the turbo compressor 5, the hydraulic motor 10 is driven by pressurized fluid from the pump 13. The pressurized fluid is delivered to the motor 10 through the conduit 14 and is returned to the reservoir 17 through the conduit 15. Meanwhile, the valve 34 may be acting to control the output of the motor 10. For example, the valve may be designed to be throttled more when the air pressure in the reservoir 7 is lower and to be throttled less when it is higher. In any case, as soon as the turbo supercharger 2 ceases to require an auxiliary drive from the hydraulic motor 10 (as indicated, in the embodiment shown in the drawing, when air pressure in the air reservoir 7 reaches a given limiting value) the motor 10 is disconnected from the hydraulic conduit 14 and is connected to the air lines 43 and 44. The motor 10 now acts as a pump or blower and draws air out of the line 43 to send it into the conduit 15. The air cools the rotors of the motor 10 and draws off the heat resulting from friction. The line 43 advantageously communicates with the crank case of the engine 1 so that the air from the crank case (which always contains oil vapours) lubricates the rotors 11 and 12 (now rotating in oily air). Alternatively, air from other sources may be used provided that enough lubricating oil is fed either to the air, e.g., by atomization, or directly to the motor 10 itself. Since the air flowing through the motor 10 contains oil, it is preferably discharged through conduit 15 into reservoir 17 for separation of the oil vapours or droplets contained in it.

Obviously, it is not necessary that the spool valve 40 and control valve 34 operate in response to the pressure of the air in reservoir 7 as shown in the drawing. Instead, automatic operation of these components may depend on other operating parameters of the piston engine, such as the crankshaft speed, the turbo supercharger speed, or the pressure in conduit 14. Also, the pump 13 need not be operated by the piston engine crankshaft as shown in the drawings, but by a separate motor, e.g., an electric motor as shown in FIG. 1.

The embodiment of my apparatus shown in FIG. 3 is similar to that of FIG. 2. However, a spool valve 50 is provided that is adapted to control not only the air or oil supply to the motor 10 (like the spool valve 40 in FIG. 2) but also the discharge of air and oil from this motor. According to the position of the spool valve member 51, either the hydraulic fluid flowing through the motor 10 is sent into a conduit 52, or the air passing through the motor 10 is sent into a line 53. The conduit 52 leads to the pressure (discharge) conduit from transfer pump 30, and the line 53, like the conduit 15 in the FIGS. 1 and 2, leads into the tank 17. In this embodiment, when the motor 10 is running on hydraulic fluid, the pressure level in its hydraulic circuit is raised by the pressure of the lubricating pump, which has the advantage of, for example, preventing cavitation and foaming of the oil.

Obviously, in this embodiment the pump 13 may also be operated by a separate motor. In addition the line 53 may lead back into the crank case of the piston engine 1 or into a stack. The valve 50, instead of being a spool valve operated by air pressure, may be an electromagnetically operated valve or similar control means.

More generally, while the invention has been described hereinabove in terms of a number of presently preferred embodiments thereof, the invention itself is not limited thereto but rather comprehends all modifications on and departures from those embodiments properly falling within the spirit and scope of the appended claims.

I claim:

1. In a supercharged internal combustion piston engine having at least one turbo compressor for supplying combustion air to the engine and an auxiliary drive for supplying additional power to the turbo compressor, said auxiliary drive comprising a hydraulic volumetric motor unit coupled directly to the drive shaft of turbo compressor and a power driven hydraulic pump unit connected by hydraulic conduits to the hydraulic motor unit and to a reservoir for hydraulic fluid, the improvement which comprises shiftable means for selectively connecting the motor unit to a source of air in place of said pump unit, and means for shifting said shiftable means in response to variations of an engine operating parameter representative of supercharging air pressure.

2. The piston engine according to claim 1 in which said shiftable means comprises a normally closed pressure actuated valve disposed in an air conduit connecting said source of air to said motor unit, said pressure actuated valve being adapted to open to permit air to flow through said air conduit to said motor unit when the pressure on the pressure-responsive actuating mechanism of the valve reaches a predetermined value.

3. The piston engine according to claim 2 in which said shiftable means includes a normally open pressure actuated valve disposed in the hydraulic conduit leading to the hydraulic motor unit, said pressure actuated valve being adapted to close off the flow of hydraulic fluid to the motor unit when the pressure on the pressure-responsive actuating mechanism of the valve reaches a predetermined value.

4. The piston engine according to claim 3 in which the normally closed valve in said air conduit and the normally open valve in said hydraulic conduit are coupled together and are simultaneously opened and closed, respectively, when pressure on the pressure-responsive mechanism of the valves reaches a predetermined value.

5. The piston engine according to claim 3 in which a normally open pressure actuated valve is disposed in the hydraulic conduit leading away from the hydraulic motor unit, said normally open valve being coupled to the normally open valve in the hydraulic conduit leading to the motor unit whereby both of said valves close simultaneously when the actuating pressure reaches said predetermined value.

6. The piston engine according to claim 3 in which the hydraulic conduits leading to and from the hydraulic motor unit are connected by a by-pass conduit provided with a valve having a pressure-responsive actuating mechanism, said valve being adapted to open to permit hydraulic fluid to by-pass the hydraulic motor unit when the pressure on the pressure-responsive actuating mechanism of the valve reaches a predetermined value.

7. The piston engine according to claim 2 in which the normally closed pressure actuated valve in said air conduit opens when the pressure differential between the pressure of hydraulic fluid in said hydraulic conduit and the pressure of air at said source of air reaches a predetermined value.

8. The piston engine according to claim 2 in which the normally closed pressure actuated valve opens when the pressure of compressed combustion air being delivered to the piston engine reaches a predetermined value.

9. The piston engine according to claim 1 in which the source of air is atmospheric air.

10. The piston engine according to claim 1 in which the source of air is compressed air from the turbo compressor.

11. The piston engine according to claim 1 in which the source of air is the air contained in the crank case of the piston engine.

12. The piston engine according to claim 1 in which the hydraulic volumetric motor unit is a hydraulic screw machine having a plurality of parallel rotors.

References Cited

UNITED STATES PATENTS 2,968,914   1/1961   Birmann _____ 60—13

FOREIGN PATENTS 282,834   3/1928   Great Britain.
488,396   7/1938   Great Britain.

MARTIN P. SCHWADRON, *Primary Examiner.*

D. HART, *Assistant Examiner.*